(12) United States Patent
Nakatani et al.

(10) Patent No.: US 10,724,921 B2
(45) Date of Patent: Jul. 28, 2020

(54) OPTICAL CABLE MONITORING SYSTEM

(71) Applicant: Hitachi Metals, Ltd., Tokyo (JP)

(72) Inventors: Yoshihiro Nakatani, Tokyo (JP); Wataru Ohnuki, Tokyo (JP); Kanako Suzuki, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/148,300

(22) Filed: Oct. 1, 2018

(65) Prior Publication Data

US 2019/0137355 A1  May 9, 2019

(30) Foreign Application Priority Data

Nov. 9, 2017  (JP) .................. 2017-216392

(51) Int. Cl.
  *G01N 21/00*  (2006.01)
  *G01M 11/00*  (2006.01)

(52) U.S. Cl.
  CPC .... *G01M 11/3136* (2013.01); *G01M 11/3145* (2013.01)

(58) Field of Classification Search
  CPC .......... G01M 11/3109; G01M 11/338; G01M 11/3145; G01M 11/335; G01M 11/33
  USPC ..................................................... 356/73.1
  See application file for complete search history.

(56) References Cited

U.S. PATENT DOCUMENTS

| 2006/0170410 | A1* | 8/2006 | Bjorn ................... G01R 31/025 324/96 |
| 2013/0208264 | A1* | 8/2013 | Ahadian ............ G01M 11/3145 356/73.1 |
| 2015/0168253 | A1* | 6/2015 | Chin .................... G01M 11/083 356/73.1 |
| 2016/0142136 | A1* | 5/2016 | Izumi ............... H04B 10/07955 398/38 |

FOREIGN PATENT DOCUMENTS

JP  2011-196686 A  10/2011
WO  WO-2007088976 A1 *  8/2007  ........ G01M 11/3136

* cited by examiner

*Primary Examiner* — Md M Rahman
(74) *Attorney, Agent, or Firm* — McGinn IP Law Group, PLLC

(57) ABSTRACT

Provided is an optical cable monitoring system for monitoring a health of optical cables including plural optical fibers. The system includes an optical power detector including a light power monitor, a failure determination unit and an alert signal generator, the light power monitor measuring light intensity of an extracted portion of communication light transmitted through each optical fiber and obtaining communication light intensity based on the measured light intensity, the failure determination unit determining presence of failure in each optical fiber based on the measurement result of the light power monitor, and the alert signal generator generating an alert signal when failure is determined to occur by the failure determination unit, and a monitoring device that receives an alert signal from the optical power detector.

17 Claims, 10 Drawing Sheets

FIG.11A

DETAILS OF FAILURE (96)

| FAILED PORT | LOCATION OF FAILURE | EVENT OF FAILURE | TIME OF FAILURE |
|---|---|---|---|
| ***#1~#100 | 12,050m | WIRE BREAKAG | 2017.07.03 13:15:00 ~ 2017.07.03 13:15:20 |

CAUSES OF FAILURE (97)

| FAILED PORT | DURATION OF FAILURE | PROBABLE CAUSE |
|---|---|---|
| PLURAL PORTS | SEVERAL CORES BROKEN IN 20 SECONDS | ROAD EXCAVATION WORK |

RESPONSE TO FAILURE (98)

| No. | INSTRUCTION | RESULT ENTRY FIELD |
|---|---|---|
| 1 | CHECK WORK PROJECT INFORMATION AROUND 12,000m-POINT | ONE ROAD-WIDENING WORK, APPLICATION FILED |
| 2 | CHECK PRESENCE OF NEARBY CABLES | THERE ARE NEARBY CABLES |
| 3 | CHECK CONDITION OF NEARBY CABLES | LOSS FLUCTUATION ≤ 1 dB, NORMAL |

FIG.11B

DETAILS OF FAILURE (96)

| FAILED PORT | LOCATION OF FAILURE | EVENT OF FAILURE | TIME OF FAILURE |
|---|---|---|---|
| ***#1 | 150m | LOSS FLUCTUATION | 2017.07.03 13:15:00 ~ CONTINUING |

CAUSES OF FAILURE (97)

| FAILED PORT | DURATION OF FAILURE | PROBABLE CAUSE |
|---|---|---|
| ONE PORT | LONG PERIOD OF TIME | FAULTY CONNECTOR CONNECTION |

RESPONSE TO FAILURE (98)

| No. | INSTRUCTION | RESULT ENTRY FIELD |
|---|---|---|
| 1 | CHECK CONNECTOR CONNECTION POINT IN BUILDING A, 1st FLOOR | CONNECTOR WAS ABOUT TO COME OFF |
| 2 | RESTORE PROPER CONNECTOR CONNECTION IN BUILDING A, 1st FLOOR | THERE ARE NEARBY CABLES |

OPTICAL CABLE MONITORING SYSTEM

CROSS-REFERENCE TO RELATED APPLICATIONS

The present application is based on Japanese patent application No. 2017-216392 filed on Nov. 9, 2017, the entire contents of which are incorporated herein by reference.

FIELD OF INVENTION

The invention relates to an optical cable monitoring system.

RELATED ART

To detect location of failure caused by breakage, etc., a method in which losses in optical fibers are measured using an OTDR (Optical Time-Domain Reflectometer) is conventionally known (see, e.g., JP 2011/196686 A).

SUMMARY OF INVENTION

Technical Problem

In recent years, there is a demand for constant monitoring of the health of optical cables which connect between buildings of data center, etc. However, optical cables connecting between buildings of data center, etc., have as many as, e.g., 100 optical fibers. If an OTDR device is used to constantly monitor such cables, monitoring (measurement) is conducted by changing optical fibers one by one and there is inevitably some period of time where cables are not monitored. No problems arise if such non-monitoring period is negligibly short, but when trying to accurately pinpoint the location of failure caused by breakage, etc., about several minutes of measurement time is required to monitor one optical fiber. Thus, time from occurrence of failure to detection thereof becomes very long. As such, it is not realistic to constantly monitor all cores using only the OTDR device.

It is an object of the invention to provide an optical cable monitoring system capable of constantly monitoring the health of optical cables.

Solution to Problem

According to an embodiment of the invention, an optical cable monitoring system for monitoring a health of optical cables comprising a plurality of optical fibers comprises:

an optical power detector comprising a light power monitor, a failure determination unit and an alert signal generator, the light power monitor measuring light intensity of an extracted portion of communication light transmitted through each optical fiber and obtaining communication light intensity based on the measured light intensity, the failure determination unit determining presence of failure in each optical fiber based on the measurement result of the light power monitor, and the alert signal generator generating an alert signal when failure is determined to occur by the failure determination unit; and a monitoring device that receives an alert signal from the optical power detector.

Effects of Invention

According to an embodiment of the invention, an optical cable monitoring system can be provided which is capable of constantly monitoring the health of optical cables.

BRIEF DESCRIPTION OF DRAWINGS

FIGS. 11A and 11B are diagrams illustrating examples of troubleshooting measure screen image.

DESCRIPTION OF EMBODIMENTS

Embodiment

An embodiment of the invention will be described below in conjunction with the appended drawings.

General Configuration of Optical Cable Monitoring System

Figure 1:
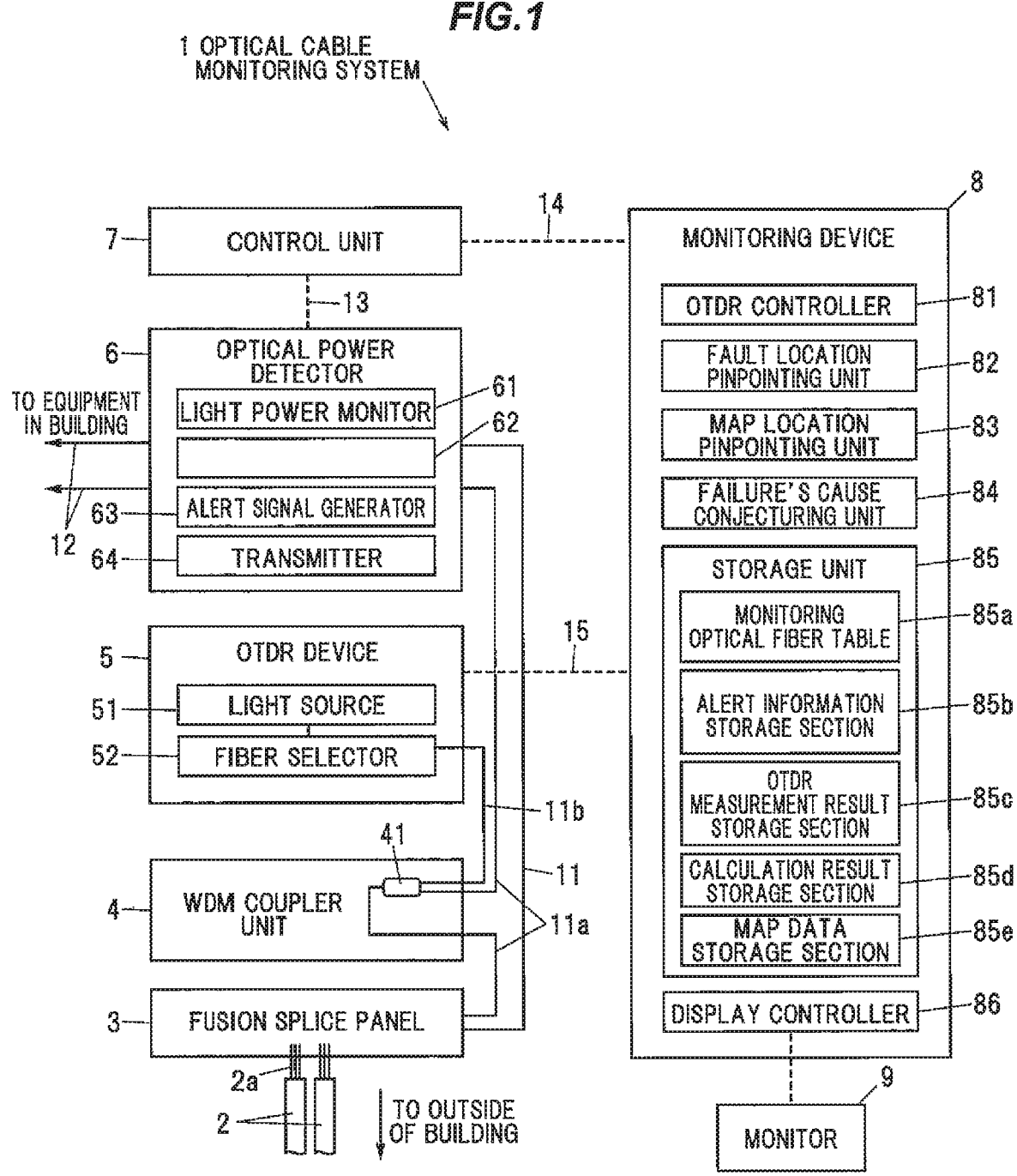
FIG. 1 is a schematic configuration diagram illustrating an optical cable monitoring system in an embodiment of the present invention.
Figure 2:
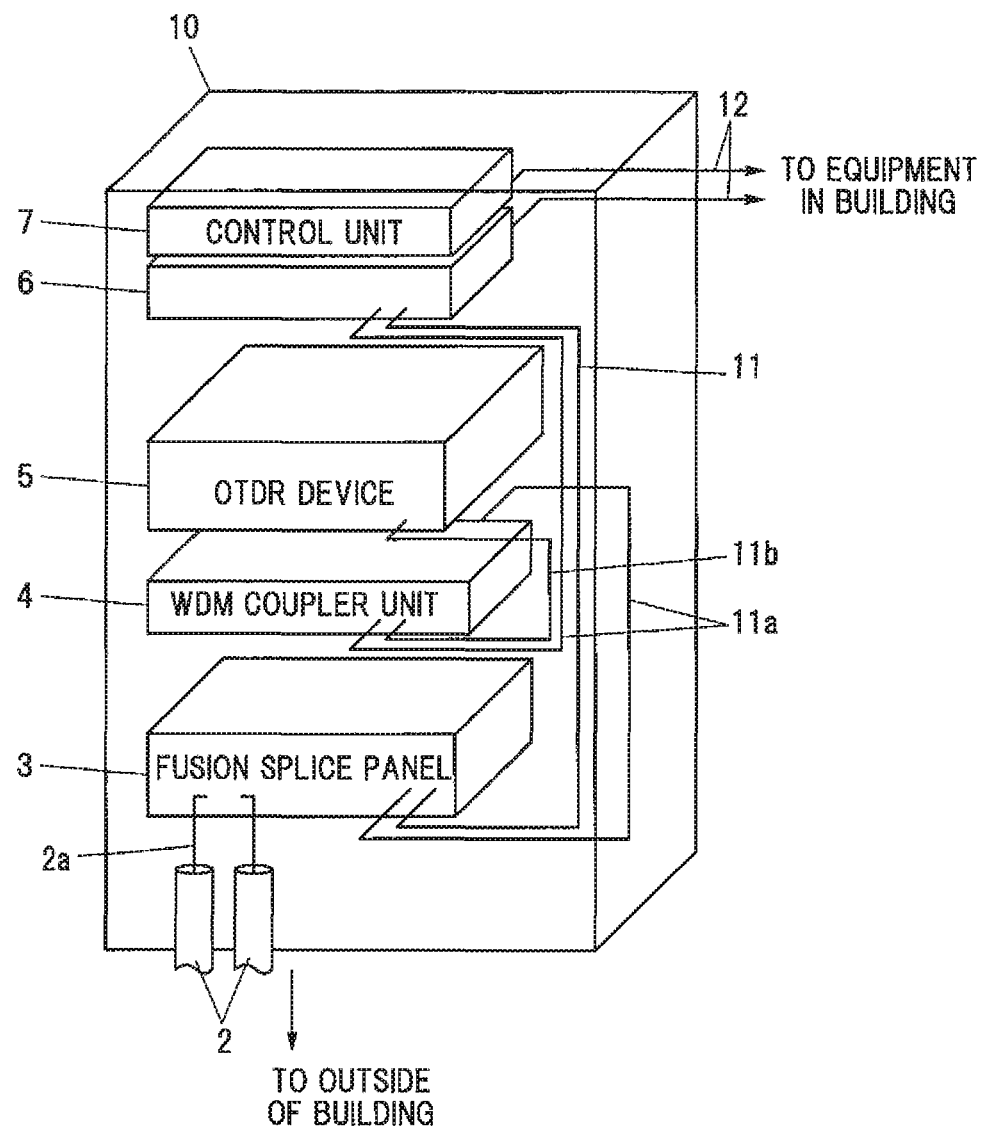
FIG. 2 is a schematic diagram illustrating an OTDR device and an optical power detector, etc., housed in a rack.
Figure 3:
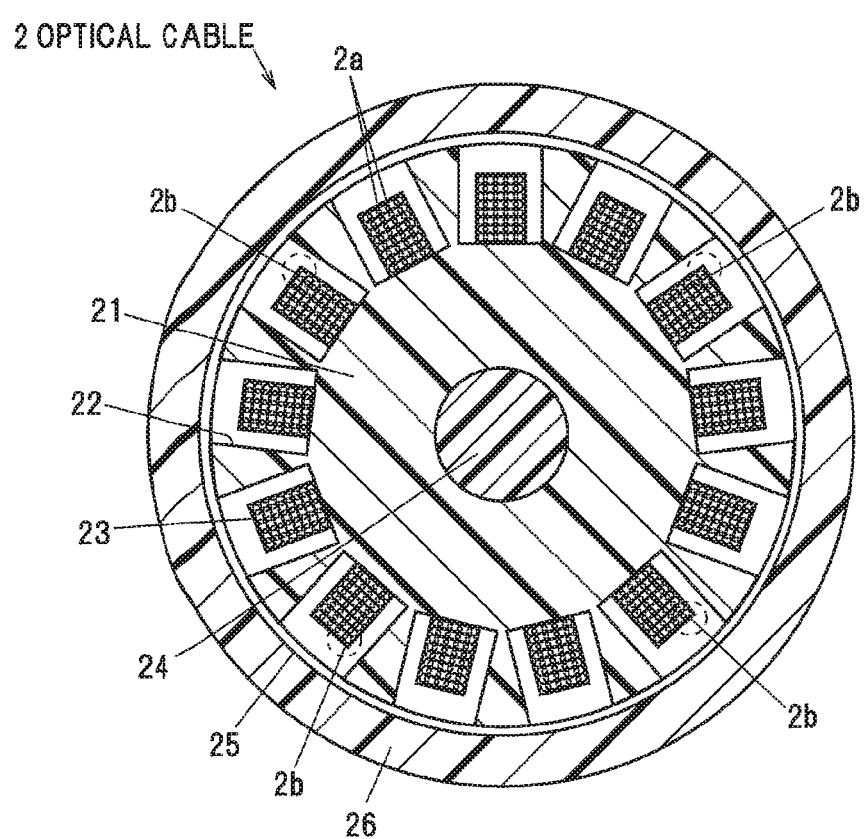
FIG. 3 is a cross sectional view showing an optical cable taken perpendicular to a longitudinal direction thereof.

FIG. 1 is a schematic configuration diagram illustrating an optical cable monitoring system in the present embodiment. FIG. 2 is a schematic diagram illustrating an OTDR device and an optical power detector, etc., housed in a rack. FIG. 3 is a cross sectional view showing an optical cable taken perpendicular to a longitudinal direction thereof.

The purpose of an optical cable monitoring system 1 is to monitor the health of optical cables 2 each containing plural optical fibers 2a. The optical cable 2 connects between buildings of data center, etc., and has a length of up to, e.g., about 80 km. The optical cable 2 contains, e.g., one hundred optical fibers 2a. A single-mode optical fiber suitable for long distance transmission is preferably used as the optical fiber 2a.

As the optical cable 2, it is possible to use, e.g., a spacer-type optical cable as shown in FIG. 3. In the example shown in FIG. 3, the optical cable 2 has a spacer 21 having plural helical slots 22 on an outer periphery, and plural tape-shaped optical fibers 23 each formed by arranging plural (e.g., four) optical fibers 2a in parallel are stacked and housed in each slot 22. A tension member 24 is provided at the position of the central axis of the spacer 21, and a waterproof tape 25 and a sheath 26 are sequentially provided around the spacer 21. The optical cable 2, however, is not limited to the spacer type.

In the present embodiment, some of the optical fibers 2a in the optical cable 2 are also used as monitoring optical fibers 2b. In the present embodiment, the monitoring optical fibers 2b are also used in normal communication application. In the meantime, if the monitoring optical fibers 2b are arranged only on one side in a circumferential direction of the optical cable 2 in an imbalanced manner, failure may be hard to be detected. Thus, it is preferable that the optical cable 2 have not less than three monitoring optical fibers 2b which are spaced at substantially equal intervals in the circumferential direction of the optical cable 2. In addition, since failure is more likely to occur in the optical fibers 2a closer to the outer periphery of the optical cable 2, the monitoring optical fibers 2b are desirably arranged as close to the outer periphery of the optical cable 2 as possible. In the example shown in FIG. 3, among the optical fibers 2a of the outermost tape-shaped optical fibers 23, four optical fibers 2a arranged at substantially equal intervals in the circumferential direction of the optical cable 2 are used as the monitoring optical fibers 2b as indicated by dashed-line circles.

As shown in FIGS. 1 and 2, the optical cable monitoring system 1 is provided with a fusion splice panel 3, a WDM (Wavelength Division Multiplexing) coupler unit 4, an OTDR (Optical Time-Domain Reflectometer) device 5, an optical power detector 6, a control unit 7, a monitoring device 8 and a monitor 9. The fusion splice panel 3, the WDM coupler unit 4, the OTDR device 5, the optical power detector 6 and the control unit 7 are mounted on a rack 10 and arranged in a building of data center, etc. The monitoring device 8 may be arranged either inside or outside the building in which the rack 10 is arranged.

An end of each optical fiber 2a of the optical cable 2 is optically connected to the fusion splice panel 3 by fusion. The fusion splice panel 3 is also optically connected to the optical power detector 6 via inter-device optical interconnects 11. Among the inter-device optical interconnects 11 between the fusion splice panel 3 and the optical power detector 6, an inter-device optical interconnect 11a is optically connected to the monitoring optical fiber 2b, and the WDM coupler unit 4 is inserted into the inter-device optical interconnect 11a. An inter-device optical interconnect 11b extending from the OTDR device 5 is also connected to the WDM coupler unit 4.

As shown in FIGS. 1 and 4, plural WDM couplers 41 are provided in the WDM coupler unit 4. Each WDM coupler 41 is inserted into the inter-device optical interconnect 11a between the fusion splice panel 3 and the optical power detector 6, and optically connects the inter-device optical interconnect 11b extending from the OTDR device 5 to the inter-device optical interconnect 11a located on the fusion splice panel 3 side. In other words, by the WDM coupler 41, the inter-device optical interconnect 11a extending from the fusion splice panel 3 is branched into the inter-device optical interconnect 11b extending toward the OTDR device 5 and the inter-device optical interconnect 11a extending toward the optical power detector 6. In this configuration, the OTDR device 5 and the monitoring optical fibers 2b can be optically connected while using the monitoring optical fibers 2b in normal communication application, allowing for measurement on the monitoring optical fibers 2b by the OTDR device 5 (detection of fault location (described later)).

Figure 4A:
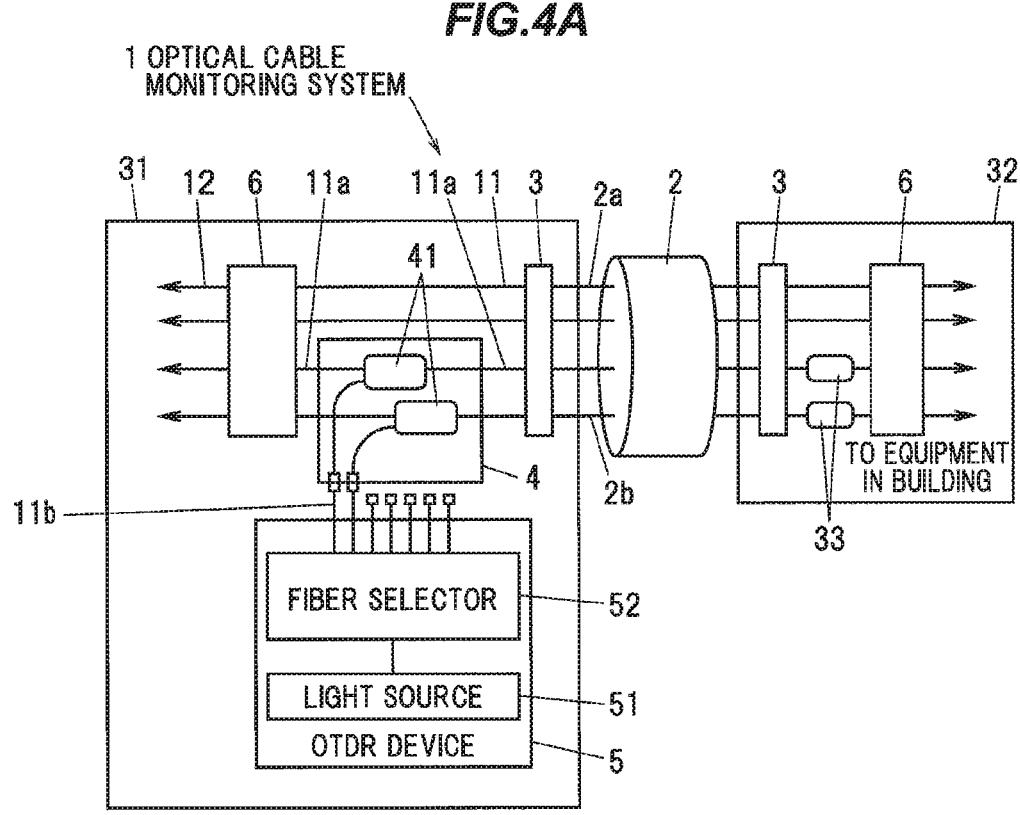
FIG. 4A is an explanatory diagram illustrating optical interconnection in the optical cable monitoring system of FIG. 1.

In the example shown in FIG. 4A, a first building 31 and a second building 32 are connected by the optical cable 2, and the rack 10 including the OTDR device 5 and the optical power detector 6 (see FIG. 2) is provided in the first building 31. The optical power detector 6 is provided also in the second building 32. In the present embodiment, since the monitoring optical fibers 2b are also used in normal communication application, filters 33 for blocking monitoring light (optical pulses) injected during measurement by the OTDR device 5 are provided on the monitoring optical fibers 2b in the second building 32.

Figure 4B:
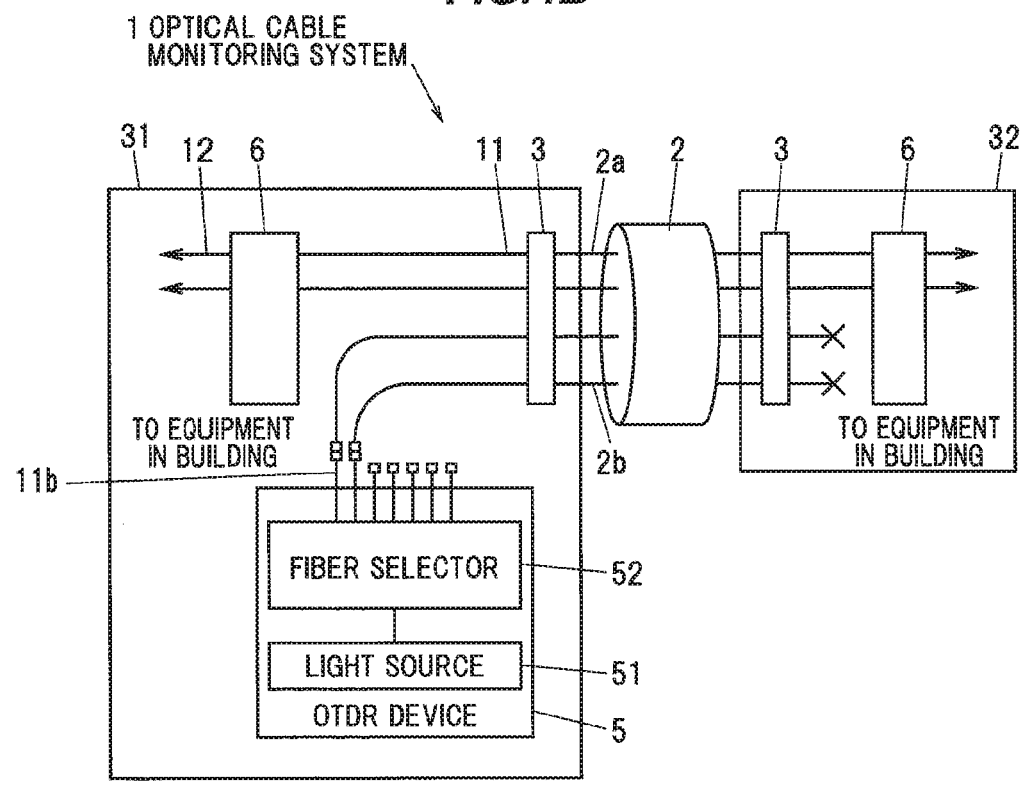
FIG. 4B is an explanatory diagram illustrating optical interconnection in the optical cable monitoring system in a modification of the invention.

Although the monitoring optical fibers 2b which are also used in normal communication application are described in this example, it is not limited thereto. The optical cable 2 may contain monitoring optical fibers 2b dedicated for monitoring and not used in normal communication application. In this case, the inter-device optical interconnects 11b extending from the OTDR device 5 and the monitoring optical fibers 2b can be connected at the fusion splice panel 3 without using the WDM coupler unit 4, and it is also possible to omit the filters 33 for blocking monitoring light, as shown in FIG. 4B. This allows for a simpler system configuration and cost reduction.

Back to FIGS. 1 and 2, the optical power detector 6 detects intensity of communication light transmitted through each optical fiber 2a. Intra-building optical interconnects 12 extending to various equipment in the building (the first building 31) are connected to the optical power detector 6. That is, one end of each non-monitoring optical fiber 2a contained in the optical cable 2 is optically connected to equipment in the building via the fusion splice panel 3, the inter-device optical interconnect 11, the optical power detector 6 and the intra-building optical interconnect 12. Meanwhile, one end of the monitoring optical fiber 2b contained in the optical cable 2 is optically connected to equipment in the building via the fusion splice panel 3, the inter-device optical interconnect 11a, the WDM coupler unit 4, the inter-device optical interconnect 11a, the optical power detector 6 and the intra-building optical interconnect 12. The optical power detector 6 is configured to be able to send data of detected communication light intensity of each optical fiber 2a to the control unit 7 via a communication cable 13 such as LAN cable.

The optical power detector 6 is also configured to monitor communication light intensity of each optical fiber 2a and send an alert signal in the event of failure. The alert signal is sent to the monitoring device 8 via the control unit 7. The details of the optical power detector 6 will be described later.

The control unit 7 collects data of light intensity detected by the optical power detector 6 and send the collected data of light intensity to the monitoring device 8 via a communication cable 14 such as LAN cable. Although one optical power detector 6 is used in the example shown in FIGS. 1 and 2, plural optical power detectors 6 may be used in such a manner that the plural optical power detectors 6 are connected to the control unit 7 and data of light intensity detected by each optical power detector 6 is collected in the control unit 7. Alternatively, without providing the control unit 7, data of light intensity may be sent from the optical power detector 6 directly to the monitoring device 8.

The OTDR device 5 has a light source 51 generating optical pulses as monitoring light, and a fiber selector 52 selecting optical fibers 2a to be subjected to measurement (selecting the monitoring optical fibers 2b in this example). The OTDR device 5 injects optical pulses into the monitoring optical fibers 2b selected by the fiber selector 52 and measures intensity of return light (light scattered and reflected back) from the monitoring optical fibers 2b. Data of measured intensity of return light is sent to the monitoring device 8 via a communication cable 15 such as LAN cable.

Alternatively, the control unit 7 may be configured to have a function of the OTDR device 5 so that communication from the monitoring device 8 is concentrated to the control unit 7. In this case, it is possible to omit the communication cable 15 as well as the communication function in the OTDR device 5, allowing for further cost reduction.

The monitoring device 8 monitors the health of each optical fiber 2a contained in the optical cable 2 based on data of light intensity or alert signal received from the optical power detector 6, and also pinpoints fault location in the event of failure by controlling the OTDR device 5. The monitor 9 is connected to the monitoring device 8, so data of light intensity or fault location, etc., is displayed on the monitor 9. The monitoring device 8 is constructed from, e.g., a computer having a communication function, such as server. The details of the monitoring device 8 and the screen image displayed on the monitor 9 will be described later.

In this manner, in the present embodiment, each optical fiber 2a contained in the optical cable 2 is constantly monitored by the optical power detector 6 and fault location is automatically pinpointed by the OTDR device 5 in the event of failure. It is not possible to pinpoint fault location only by the optical power detector 6, and it is difficult to constantly monitor only by the OTDR device 5 due to the cost and accuracy, etc. However, in the present embodiment, the optical cable monitoring system 1 capable of constantly monitoring the health of the optical cable 2 and accurately pinpointing fault location is realized at low cost by combining the optical power detector 6 with the OTDR device 5. Next, the details of each component will be described.

Optical Power Detector 6

The optical power detector 6 has a light power monitor 61, a failure determination unit 62, an alert signal generator 63 and a transmitter 64.

The light power monitor 61 measures light intensity of an extracted portion of communication light transmitted through each optical fiber 2a and obtains communication light intensity based on the measured light intensity. The light power monitor 61 is formed by combining an analog circuit for amplification and a digital processing circuit for signal processing. The structure to extract a portion of communication light and the details of the light power monitor 61 will be described later.

The failure determination unit 62 determines presence of failure in each optical fiber 2a based on the measurement result of the light power monitor 61. The failure determination unit 62 determines that failure is occurring in the optical fiber 2a when, e.g., communication light intensity obtained by the light power monitor 61 is not more than a predetermined lower threshold (or when the communication light intensity stays not more than the lower threshold for a predetermined period of time).

The alert signal generator 63 generates an alert signal when occurrence of failure is determined to occur by the failure determination unit 62. The transmitter 64 transmits data of communication light intensity of each optical fiber 2a obtained by the light power monitor 61 and an alert signal generated by the alert signal generator 63 to the control unit 7 (to the monitoring device 8 via the control unit 7). The failure determination unit 62, the alert signal generator 63 and the transmitter 64 are realized by appropriately combining an arithmetic element such as CPU, a memory, a software and an interface, etc.

Although the failure determination unit 62 and the alert signal generator 63 are mounted on the optical power detector 6 in the present embodiment, the failure determination unit 62 and the alert signal generator 63 may be mounted on the monitoring device 8. In other words, the monitoring device 8 may be configured to determine occurrence of failure based on data of light intensity received from the optical power detector 6.

Structure to Extract a Portion of Communication Light

Figure 5:
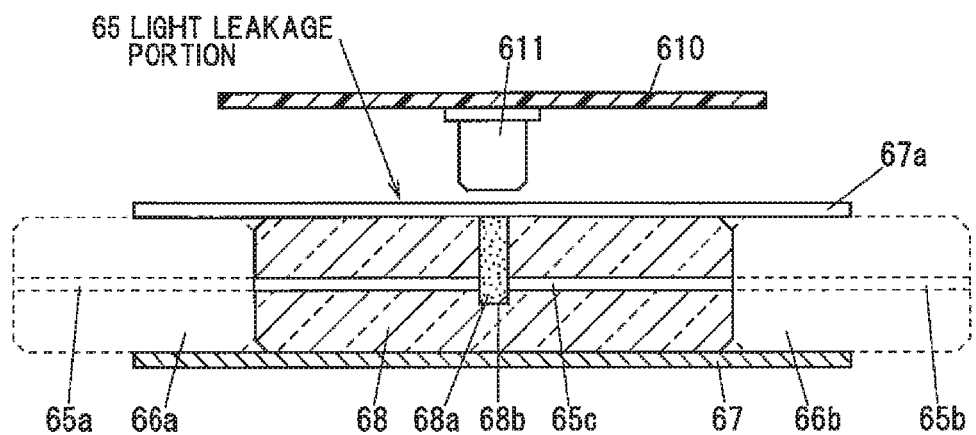
FIG. 5 is an explanatory diagram illustrating a structure to extract a portion of communication light in the optical power detector.

FIG. 5 is an explanatory diagram illustrating a structure to extract a portion of communication light in the optical power detector 6. As shown in FIG. 5, the optical power detector 6 has a light leakage portion 65 which leaks a portion of communication light. The light leakage portion 65 is provided at a connecting portion between a first optical fiber 65a, which is optically connected to one of the inter-device optical interconnect 11a and the intra-building optical interconnect 12, and a second optical fiber 65b, which is optically connected to the other of the inter-device optical interconnect 11a and the intra-building optical interconnect 12. One end of the first optical fiber 65a is housed in a first ferrule 66a. An end face of the first optical fiber 65a, together with an edge surface of the first ferrule 66a, is polished. Meanwhile, one end of the second optical fiber 65b is housed in a second ferrule 66b. An end face of the second optical fiber 65b, together with an edge surface of the second ferrule 66b, is polished.

A joining member 68 which is a ferrule with an optical fiber 65c installed therein is arranged between the two ferrules 66a and 66b. The joining member 68 is inserted into a split sleeve 67. The first ferrule 66a is inserted into the split sleeve 67 from one end of the split sleeve 67, and an end face of the first optical fiber 65a is butt-joined to an end face of the optical fiber 65c. Likewise, the second ferrule 66b is inserted into the split sleeve 67 from the other end of the split sleeve 67, and an end face of the second optical fiber 65b is butt-joined to the other end face of the optical fiber 65c. The split sleeve 67 has a C-shape in a cross section and is formed by providing a slit 67a on a hollow cylinder along an axial direction. The both ferrules 66a, 66b and the joining member 68 are formed of zirconia ceramic, etc., which transmits as well as scatters communication light. In the present embodiment, the split sleeve 67 is also formed of zirconia ceramic, or is constructed from a member formed of metal, etc.

The joining member 68 has a light detection groove 68b formed from the outer surface of the joining member 68 so as to intersect the optical fiber 65c. The light detection groove 68b is formed by a machining means such as dicing using a blade, or etching. A light-receiving element 611 is arranged to face the light detection groove 68b.

Inside the light detection groove 68b may be a vacuum, but the light detection groove 68b is preferably filled with a resin 68a which has a lower refractive index than that of a core of the optical fiber 65c. The resin 68a may be a liquid resin, a thermosetting or ultraviolet (UV) curable resin, or an adhesive of which refractive index after curing is lower than that of the core of the optical fiber 65c. More preferably, the resin 68a filling the light detection groove 68b has a refractive index lower than the refractive index of the core of the optical fiber 65c and also lower than the refractive index of a cladding of the optical fiber 65c.

In the light leakage portion 65, a portion of communication light transmitted via the both optical fibers 65a and 65b leaks out at the light detection groove 68b. Leaking light, which is the leaked portion of communication light, is received by the light-receiving element 611 of the light power monitor 61.

The configuration described in reference to FIG. 5 is only an example, and the structure to leak a portion of communication light is not limited to that shown in the drawing. Furthermore, use of the light leakage portion 65 in the structure to extract a portion of communication light is not essential. For example, the configuration may be such that a portion (e.g., about 1%) of communication light is branched by a tap (coupler) and the light-receiving element 611 receives the branched portion of communication light.

Light Power Monitor 61

Figure 6:
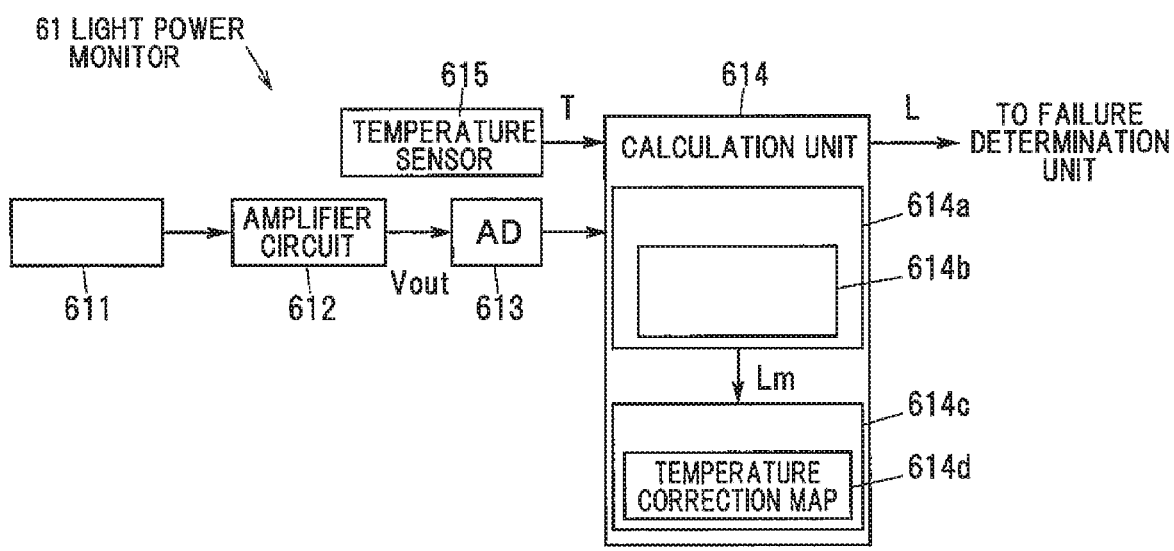
FIG. 6 is a schematic configuration diagram illustrating a light power monitor.

FIG. 6 is a schematic configuration diagram illustrating the light power monitor 61. As shown in FIG. 6, the light power monitor 61 has the light-receiving element 611 which receives leaking light leaking out at the light leakage portion 65, an amplifier circuit 612 which converts a current signal of the light-receiving element 611 into a voltage signal and also amplifies the signal, an AD converter 613 which converts output voltage Vout of the amplifier circuit 612 into a digital signal, and a calculation unit 614 which calculates communication light intensity based on the output voltage Vout converted into a digital signal. The light-receiving element 611 is constructed from a PD (Photodiode). As shown in FIG. 5, the light-receiving element 611 is arranged to face the light detection groove 68b. The light-receiving element 611, the amplifier circuit 612, the AD converter 613 and the calculation unit 614 are mounted on a circuit board 610.

Figure 7:
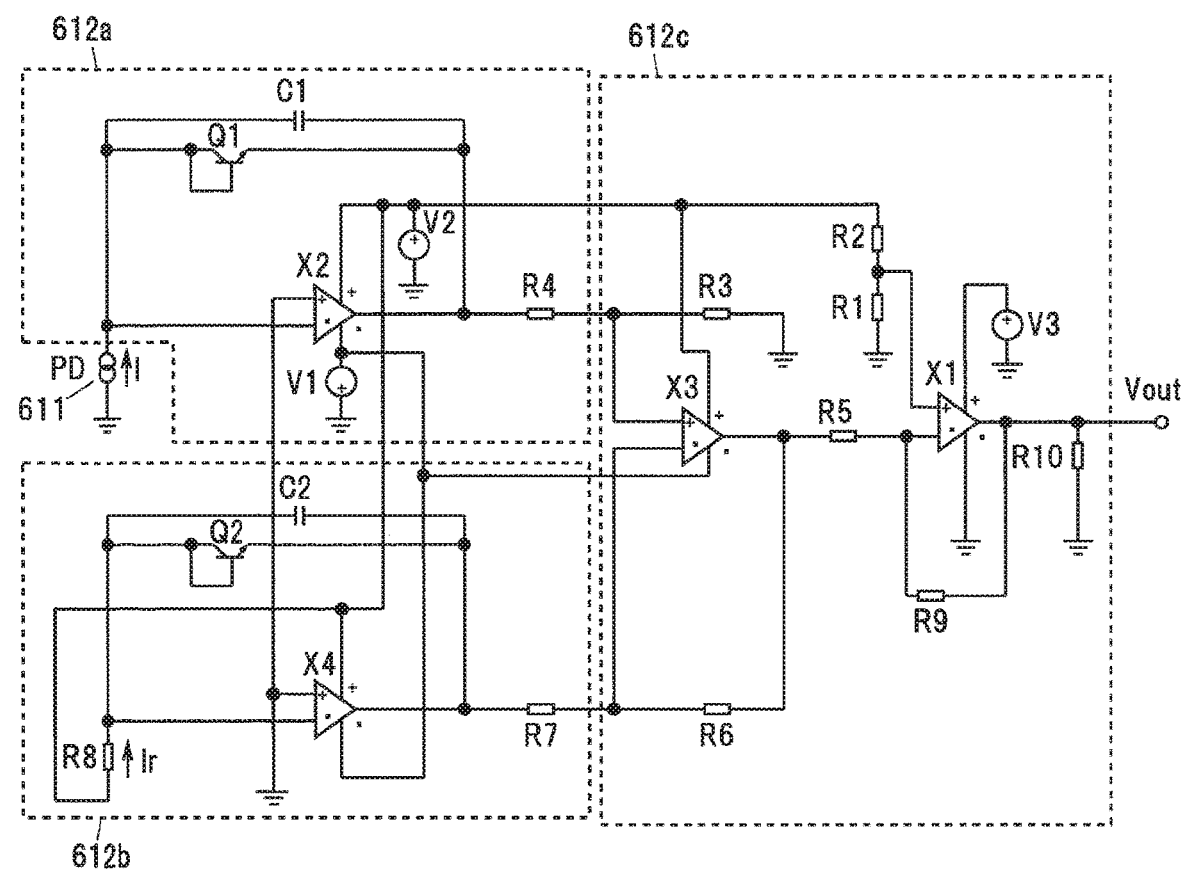
FIG. 7 is a circuit diagram illustrating an example of an amplifier circuit.

FIG. 7 is a circuit diagram illustrating an example of the amplifier circuit 612. As shown in FIG. 7, the amplifier circuit 612 has a PD amplifier circuit portion 612a which amplifies a current I generated by the light-receiving element 611, a reference amplifier circuit portion 612b having substantially the same circuit configuration as the PD amplifier circuit portion 612a, and a differential amplifier circuit portion 612c which amplifies a difference between output of the PD amplifier circuit portion 612a and output of the reference amplifier circuit portion 612b. In FIG. 7, R1 to R10 denote resistors, C1 and C2 denote capacitors (capacitative elements), X1 to X4 denote op-amps, Q1 and Q2 denote transistors, and V1 to V3 denote voltage sources.

In general, in the PD used as the light-receiving element 611, variation of the current I obtained in a region receiving light with relatively low intensity is smaller than variation of the current I obtained in a region receiving light with relatively high intensity, and a relation between intensity of received light and the current I is not linear. Based on this fact, in the present embodiment, the transistor Q1 is inserted into a feedback circuit of the op-amp X2 in the PD amplifier circuit portion 612a. Since the resistance of the transistor Q1 is higher with the smaller current I and lower with the larger current I, the gain of the op-amp X2 is higher with the smaller current I and lower with the larger current I, resulting in that substantially the same operation as a log amplifier is obtained. As a result, a relation between intensity of light received by the light-receiving element 611 and output voltage of the op-amp X2 becomes closer to linear and it is thereby possible to improve detection accuracy particularly in a region receiving light with relatively low intensity. A diode may be used in place of the transistor Q1.

The reference amplifier circuit portion 612b has substantially the same circuit configuration as the PD amplifier circuit portion 612a and is configured that the transistor Q2 is inserted into a feedback circuit of the op-amp X4. The op-amp X4 and the transistor Q2 respectively have the same characteristics as the op-amp X2 and the transistor Q1 of the PD amplifier circuit portion 612a.

In the reference amplifier circuit portion 612b, a current source delivering a constant reference current Ir is formed by the voltage source V2 and the resistor R8, in place of the light-receiving element 611. The reference current Ir is generally set to the minimum detectable value of the current I of the light-receiving element 611 (e.g., 10 pA), but in order to set to such value, the resistor R8 with a very high resistance value needs to be used. In addition, since the error in the reference current Ir provokes a decrease in accuracy, an expensive component having a very small resistance error needs to be used as the resistor R8. In the present embodiment, since the calculation unit 614 (described alter) performs temperature correction (the details will be described later), the effect of the reference current Ir can be compensated during the temperature correction and this allows the reference current Ir to be set relatively freely. In other words, a cheap component with a relatively low resistance value can be used as the resistor R8 in the present embodiment and it is thereby possible to reduce the cost.

The differential amplifier circuit portion 612c amplifies a difference between output of the PD amplifier circuit portion 612a and output of the reference amplifier circuit portion 612b, and outputs a voltage signal corresponding to variation of the current I in the light-receiving element 611 (variation with respect to the reference current Ir). Although amplification in this example is performed in two stages by using the two op-amps X1 and X3, amplification may be performed in one stage or not less than three stages. The output voltage Vout of the differential amplifier circuit portion 612c is converted into a digital signal by the AD converter 613 and is then input to the calculation unit 614.

The calculation unit 614 has a measured light intensity calculation section 614a which calculates communication light intensity based on the output voltage Vout of the amplifier circuit 612. The measured light intensity calculation section 614a has a voltage-to-light intensity conversion map 614b containing a preset relation between the output voltage Vout and light intensity, and obtains light intensity Lm corresponding to the output voltage Vout by referring to the voltage-to-light intensity conversion map 614b. The calculation unit 614 is realized by appropriately combining an arithmetic element such as CPU, a memory, a software and an interface, etc.

In the meantime, when the ambient temperature (i.e., the temperature inside the optical power detector 6) changes, the output voltage Vout of the amplifier circuit 612 changes due to temperature characteristics of each element constituting the circuit, and the change due to temperature causes an error in communication light intensity obtained by calculation. Therefore, in the present embodiment, a temperature correction function is added to the calculation unit 614 to improve accuracy of measuring communication light intensity.

In detail, the optical power detector 6 has a temperature sensor 615 for detecting temperature T inside the optical power detector 6, and the calculation unit 614 of the light power monitor 61 has a temperature correction section 614c for correcting communication light intensity based on the temperature T detected by the temperature sensor 615. As the temperature sensor 615, it is possible to use, e.g., a thermistor mounted on the circuit board 610.

The temperature correction section 614c has a temperature correction map 614d containing preset inclination correction factor k and bias correction factor b with respect to the temperature T. An example of the temperature correction map 614d is shown in Table 1. Table 1 shows an example in which output voltage of the thermistor (thermistor voltage)

is directly used instead of using the temperature T. As shown in Table 1, the lower the temperature T (the lower the thermistor voltage), the larger the inclination correction factor k and the smaller the bias correction factor b.

TABLE 1

| Thermistor voltage (V) | Inclination correction factor k | Bias correction factor b |
|---|---|---|
| 3.0 | 0.998 | 0.100 |
| 2.4 | 1.000 | 0.000 |
| . | . | . |
| . | . | . |
| . | . | . |
| 0.3 | 1.002 | −0.200 |

The temperature correction section 614c refers to the temperature correction map 614d to obtain the inclination correction factor k and the bias correction factor b corresponding to the temperature T detected by the temperature sensor 615 and corrects communication light intensity using the formula (1): $L = Lm \times k - b$, where L is communication light intensity after correction and Lm is communication light intensity before correction. Lm in the formula (1) here is communication light intensity obtained by the measured light intensity calculation section 614a.

In case that the reference current Ir in the amplifier circuit 612 is changed to a value different from the minimum detectable value of the current I of the light-receiving element 611, correction based on the change made to the reference current Ir may be simultaneously performed using the inclination correction factor k and the bias correction factor b which are set to values by taking account of the change made to the reference current Ir. The obtained light intensity L of communication light after correction is output to the failure determination unit 62.

Although temperature correction of communication light intensity is performed after calculating communication light intensity based on the output voltage Vout of the amplifier circuit 612 in this example, it is not limited thereto. After temperature correction of the output voltage Vout of the amplifier circuit 612, communication light intensity may be calculated based on the corrected output voltage Vout.

Monitoring Device 8

Back to FIG. 1, the monitoring device 8 has an OTDR controller 81, a fault location pinpointing unit 82, a map location pinpointing unit 83 and a failure's cause conjecturing unit 84. The OTDR controller 81, the fault location pinpointing unit 82, the map location pinpointing unit 83 and the failure's cause conjecturing unit 84 are realized by appropriately combining an arithmetic element such as CPU, a memory, a storage device such as hard disc drive, a software and an interface, etc.

The OTDR controller 81, when received an alert signal from the optical power detector 6, causes the OTDR device 5 to conduct a measurement (hereinafter, referred to as "OTDR measurement") of return light from the monitoring optical fibers 2b of the failure-occurring optical cable 2. In the present embodiment, a storage unit 85 stores a monitoring optical fiber table 85a containing a preset relation between port numbers of the optical fibers 2a and the monitoring optical fibers 2b to be subjected to OTDR measurement when failure occurs in the optical fibers 2a, and the OTDR controller 81 refers to the monitoring optical fiber table 85a and decides the monitoring optical fibers 2b to be subjected to OTDR measurement in the event of failure. In the present embodiment, one optical cable 2 contains, e.g., four monitoring optical fibers 2b. Thus, when failure occurs in an optical fiber 2a of a certain optical cable 2, four monitoring optical fibers 2b contained in the failure-occurring optical cable 2 can be selected as subjects for the OTDR measurement.

The OTDR controller 81, when received an alert signal, activates the OTDR device 5, stores alert information, such as date and time of receiving the alert signal, port number and type of failure, in an alert information storage section 85b, and decides the monitoring optical fibers 2b to be subjected to OTDR measurement by referring to monitoring optical fiber table 85a. Once the OTDR device 5 is activated, the OTDR controller 81 controls the fiber selector 52 to select the monitoring optical fibers 2b to be subjected to measurement and conducts OTDR measurement. The OTDR measurement result (data of intensity of return light) is stored in an OTDR measurement result storage section 85c. When plural monitoring optical fibers 2b are subjected to measurement, the same OTDR measurement is conducted by sequentially changing the monitoring optical fiber 2b using the fiber selector 52.

The OTDR controller 81 may also be configured to perform regular inspection control under which the OTDR device 5 conducts measurement on all the optical cables 2 as monitoring subjects at every predetermined time interval. In the regular inspection control, OTDR measurement is conducted on all the monitoring optical fibers 2b, e.g., every day to inspect presence of failure (presence of a portion with an abnormally high loss, etc.). The measurement result by the regular inspection control is stored in the OTDR measurement result storage section 85c.

The fault location pinpointing unit 82 pinpoints the fault location in the longitudinal direction of the optical cable 2 based on the measurement result by the OTDR controller 81 (data of intensity of return light stored in an OTDR measurement result storage section 85c). In this example, the fault location pinpointing unit 82 calculates a distance of the fault location from an end of the optical cable 2. The distance of the fault location from an end of the optical cable 2 obtained by calculation is stored in a calculation result storage section 85d.

The map location pinpointing unit 83 pinpoints the fault location on a map based on the fault location pinpointed by the fault location pinpointing unit 82 (the distance from an end of the optical cable 2). In the present embodiment, a map data containing a routing path of the optical cable 2 is pre-stored in a map data storage section 85e, and the location pinpointing unit 83 refers to the map data and pinpoints the location on the map corresponding to the distance of the fault location from an end of the optical cable 2. The fault location on the map pinpointed by the map location pinpointing unit 83 is stored in the calculation result storage section 85d.

The failure's cause conjecturing unit 84 conjectures the cause of failure based on the data of communication light intensity of each optical fiber 2a received from the optical power detector 6. The monitoring device 8 is configured that the data of communication light intensity of each optical fiber 2a for a predetermined period (e.g., for several days) is stored in the storage unit 85 and the failure's cause conjecturing unit 84 conjectures the cause of failure based on change in light intensity before and after occurrence of failure in the optical fiber 2a contained in the failure-occurring optical cable 2, or information of the number or arrangement of the failure-occurring optical fibers 2a. An example of the condition of failure (details of failure) and causes of failure is shown in Table 2. Although wire breakage due to fire is described as a cause in Table 2, breakage of the optical cable 2 does not occur only by fire, and breakage occurs due to water jet on the cable cover damaged by fire. In addition, bending loss in Table 2 occurs when, e.g., load is applied to the inter-device optical interconnect 11 or the intra-building optical interconnect 12 during operation work, etc., in the building.

TABLE 2

| Details of failure | Cause of failure |
| --- | --- |
| Breakage inside cable in a certain range Increase in loss in a certain range | Gnawed or pecked by animal or bird. |
| Breakage of the outermost periphery inside cable Inner part is normal | Wire breakage due to fire |
| Increase in loss in only one core Restored in 3 seconds Afterward, normal | Pulled out by mistake in the building |
| 1 to 3 dB of increase in loss in several irregular cores | Bending loss |

The failure's cause conjecturing unit 84 may be configured to determine the cause of failure by means of data mining or machine learning such as artificial neural network or support vector machine. By inputting a result of addressing the failure to give a feedback for the next occurrence of failure, it is possible to increase accuracy of the method for addressing the failure. The failure's cause conjecturing unit 84 may also be configured to determine the cause of failure also when there is no reception of an alert signal from the optical power detector 6 (i.e., configured to monitor occurrence of failure). In this case, a double monitoring mechanism is constructed by the optical power detector 6 and the monitoring device 8 and reliability is further improved. The cause of failure conjectured by the failure's cause conjecturing unit 84 is stored in the calculation result storage section 85*d*.

The failure's cause conjecturing unit 84 may be configured to extract a measure to address the occurring failure (an instruction to address the failure) which corresponds to the conjectured cause of failure. The instruction to address the failure is preliminary set for each cause of failure and is stored in the storage unit 85.

Figure 8:
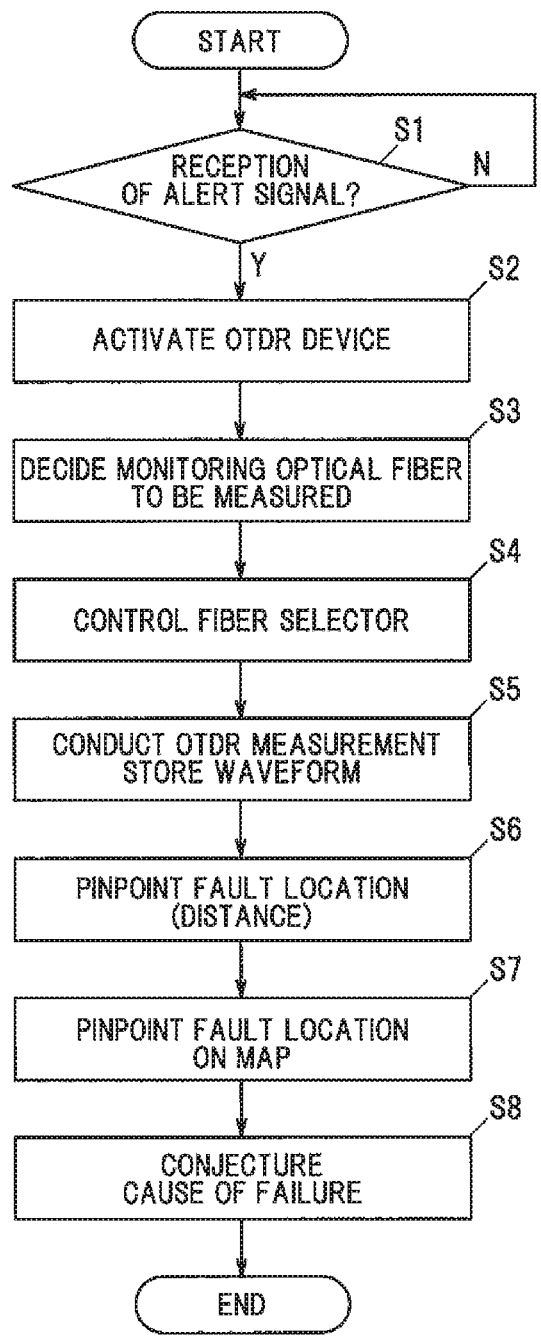
FIG. 8 is a flowchart showing a control flow of a monitoring device.

Next, a control flow of the monitoring device 8 will be described in conjunction with FIG. 8. As shown in FIG. 8, in Step S1, the monitoring device 8 firstly determines whether or not an alert signal is received. In the present embodiment, the OTDR controller 81 of the monitoring device 8 determines whether or not an alert signal is received. When determination in Step S1 is NO, the process returns to Step S1 to repeat determination. When determination in Step S1 is YES, the OTDR controller 81 activates the OTDR device 5 in Step S2 and decides the monitoring optical fibers 2*b* to be subjected to OTDR measurement by referring to the monitoring optical fiber table 85*a* in Step S3.

After that, the monitoring optical fibers 2*b* decided in Step S3 are optically connected to the light source 51 of the OTDR device 5 by controlling the fiber selector 52 in Step S4, and OTDR measurement is conducted in Step S5. The measurement result is stored in the OTDR measurement result storage section 85*c*. When plural monitoring optical fibers 2*b* are subjected to measurement, Steps S4 and S5 are repeated for each monitoring optical fiber 2*b*.

After that, the fault location pinpointing unit 82 pinpoints the fault location in the longitudinal direction of the optical cable 2 based on the measurement result obtained in Step S5, and stores the pinpointed fault location in the calculation result storage section 85*d*. Then, in Step S7, the map location pinpointing unit 83 pinpoints the fault location on the map by referring to the map data stored in the map data storage section 85*e*, and it stores the pinpointed fault location on the map in the calculation result storage section 85*d*.

After that, the failure's cause conjecturing unit 84 conjectures the cause of failure based on change in communication light intensity of each optical fiber 2*a* received from the optical power detector 6 or information of the number or arrangement of the failure-occurring optical fibers 2*a*, and stores the conjecture result in the calculation result storage section 85*d* in Step S8, thereby completing the process.

Although measurement by the OTDR device 5 is always conducted upon reception of the alert signal in the present embodiment, the configuration may be such that measurement by the OTDR device 5 is omitted and only the cause of failure is conjectured. That is, the monitoring device 8 can be configured to immediately proceed to Step S8 after determining whether or not an alert signal is received in Step S1 in FIG. 8 and to conjecture the cause of failure based on change in light intensity before and after occurrence of failure in the optical fiber 2*a* contained in the failure-occurring optical cable 2, or information of the number or arrangement of the failure-occurring optical fibers 2*a*.

Screen Image on the Monitor 9

Figure 9:
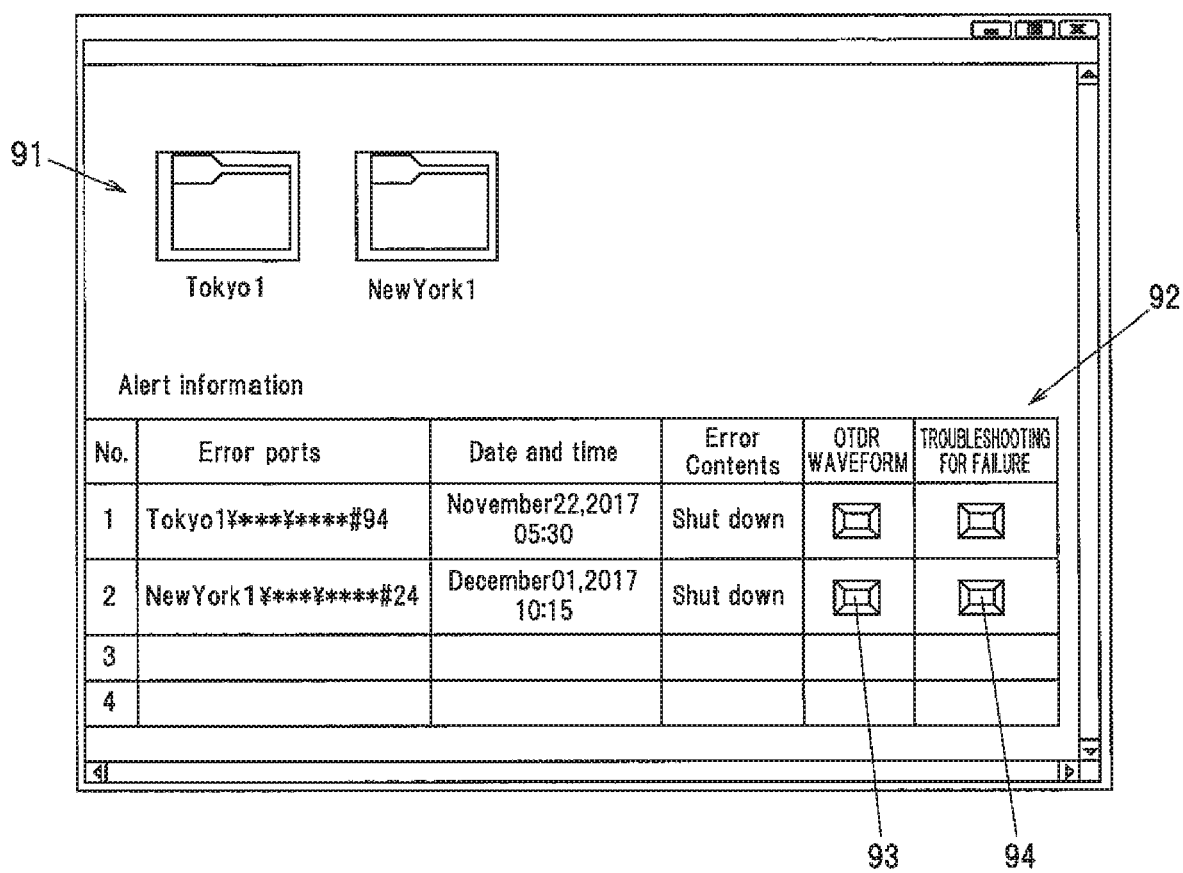
FIG. 9 is a diagram illustrating an example of a screen image displayed on a monitor by a display controller.

The monitoring device 8 is further provided with a display controller 86 which displays alert information and information of fault location, etc., on the monitor 9 by using a graphical user interface. FIG. 9 shows an example of a screen image displayed on the monitor 9 by the display controller 86.

As shown in FIG. 9, the screen image is divided into a folder display area 91 and an alert display area 92. Folders for local areas in which the monitored optical cables 2 are routed are shown in the folder display area 91. By double-clicking the folders, it is possible to see information about the optical power detectors 6 used in those areas and data (history) of communication light intensity of each port even though it is not shown in the drawing.

Figure 10A:
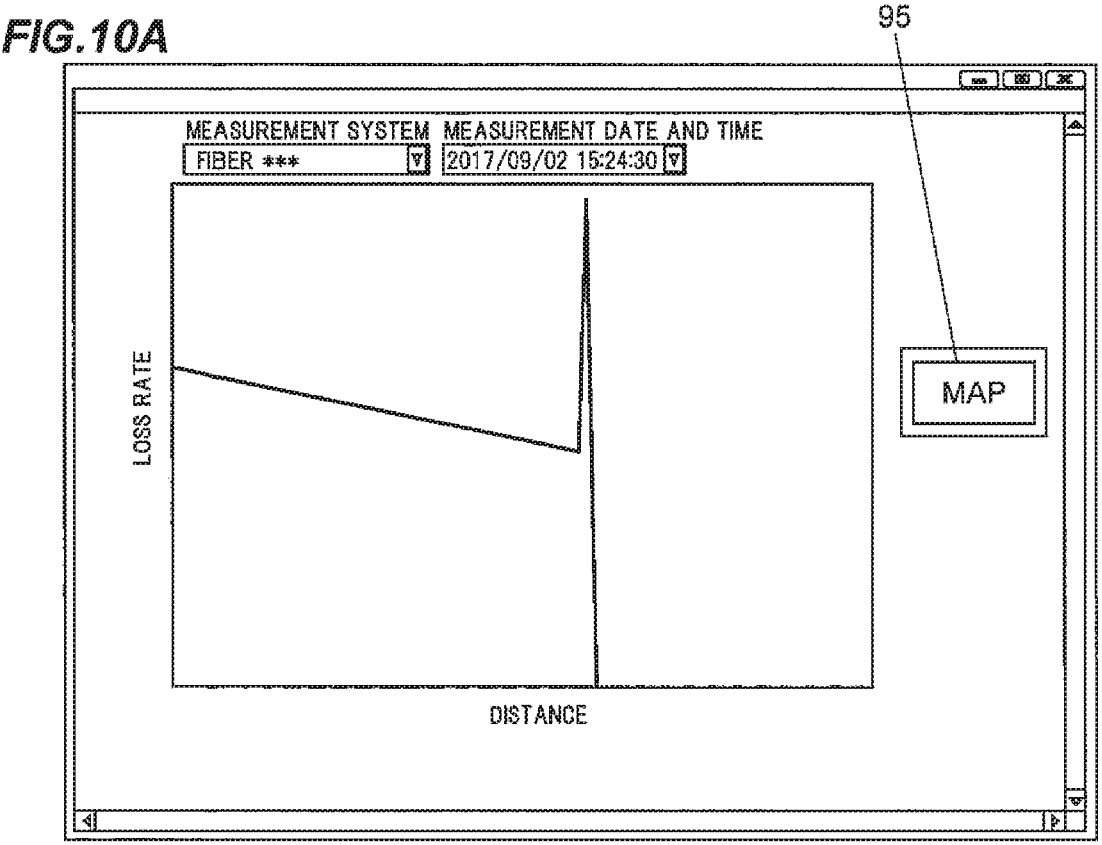
FIG. 10A is a diagram illustrating an example of an OTDR waveform screen image.
Figure 10B:
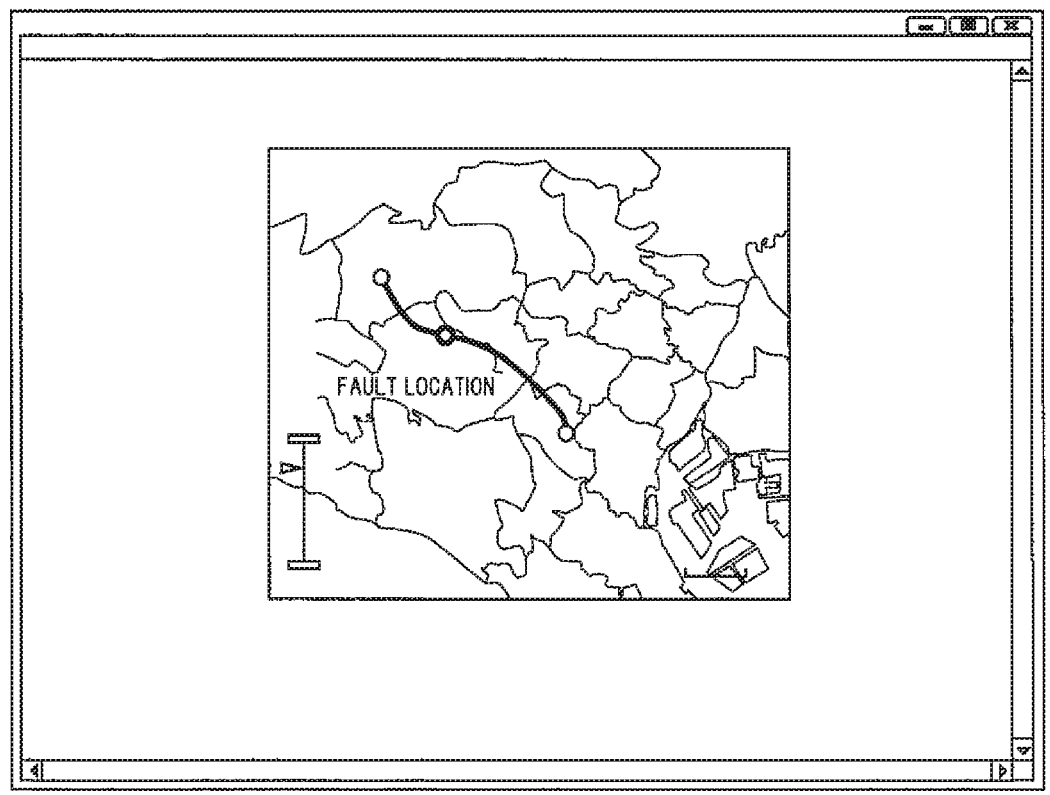
FIG. 10B is a diagram illustrating an example of a map screen image.

The alert information stored in the alert information storage section 85*b* is displayed in the alert display area 92. In this example, port number with failure (Error Port), date and time of receiving an alert signal (Date and Time) and type of failure (Error Contents) are displayed as the alert information. An OTDR waveform acquisition button (link) 93 and a troubleshooting measure acquisition button (link) 94 are provided for each alert information. When clicking the OTDR waveform acquisition button 93, an OTDR waveform screen image is displayed on the monitor 9 and shows the graph form of measurement result which is obtained by OTDR measurement conducted when receiving the corresponding alert signal and is stored in the OTDR measurement result storage section 85*c*, as shown in FIG. 10A. Although it is not shown in the drawing, the OTDR waveform screen image may be configured that the OTDR measurement result obtained by regular inspection control before occurrence of failure can be displayed together with the OTDR measurement result obtained in the event of failure. A map acquisition button (link) 95 is arranged in the OTDR waveform screen image, and when clicking the map acquisition button 95, a map screen image is displayed on the monitor 9 and shows the fault location on the map stored in the calculation result storage section 85*d*, as shown in FIG. 10B.

When clicking the troubleshooting measure acquisition button 94 in the screen image of FIG. 9, a troubleshooting measure screen image having a failure's detail display area 96, a failure's cause display area 97 and a failure response display area 98 is displayed on the monitor 9, as shown in FIGS. 11A and 11B. Port number with failure (failed port), distance of the fault location from an end of the optical cable 2 stored in the calculation result storage section 85d (location of failure), type of failure (event of failure) and time of occurrence of failure (time of failure) are displayed in the failure's detail display area 96. In failure's cause display area 97, the number of ports with failure (e.g., plural ports, one port, etc.) is displayed as "failed port", the details of failure are displayed as "duration of failure", and the cause of failure conjectured by the failure's cause conjecturing unit and stored in the calculation result storage section 85d is displayed as "probable cause". In the failure response display area 98, an instruction to address the failure which corresponds to the conjectured cause of failure is displayed. In the "result entry field" in the failure response display area 98, a comment corresponding to the instruction can be freely input. Each screen image shown in FIGS. 9 to 11 is only an example, and setting of screen layout and displayed items, etc., can be appropriately changed.

Functions and Effects of the Embodiment

As described above, the optical cable monitoring system 1 in the present embodiment is provided with the optical power detector 6 which has the light power monitor 61 measuring light intensity of an extracted portion of communication light transmitted through each optical fiber 2a and obtaining communication light intensity based on the measured light intensity, the failure determination unit 62 determining presence of failure in each optical fiber 2a based on the measurement result of the light power monitor 61, and the alert signal generator 63 generating an alert signal when failure is determined to occur by the failure determination unit 62, the OTDR device which injects optical pulses into the optical fiber 2a to be measured and measures return light from the optical fiber 2a, and the monitoring device 8 which has the OTDR controller 81 causing the OTDR device 5 to measure return light from the optical fiber 2a of the failure-occurring optical cable 2 when receiving an alert signal from the optical power detector 6.

Since the optical power detector 6 and the OTDR device 5 are used together, an alert signal can be promptly sent in the event of failure by constantly monitoring light intensity of all optical fibers 2a by the optical power detector 6, and the fault location can be promptly pinpointed in the event of failure by conducting OTDR measurement by the OTDR device 5. In other words, in the present embodiment, it is possible to realize the optical cable monitoring system 1 capable of constantly monitoring the health of the optical cable 2 and also capable of accurately pinpointing the fault location.

SUMMARY OF THE EMBODIMENTS

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] An optical cable monitoring system (1) for monitoring a health of optical cables (2) comprising a plurality of optical fibers (2a), the system (1) comprising: an optical power detector (6) comprising a light power monitor (61), a failure determination unit (62) and an alert signal generator (63), the light power monitor (61) measuring light intensity of an extracted portion of communication light transmitted through each optical fiber (2a) and obtaining communication light intensity based on the measured light intensity, the failure determination unit (62) determining presence of failure in each optical fiber (2a) based on the measurement result of the light power monitor (61), and the alert signal generator (63) generating an alert signal when failure is determined to occur by the failure determination unit (62); and a monitoring device (8) that receives an alert signal from the optical power detector (6).

[2] An optical cable monitoring system (1) for monitoring a health of optical cables (2) comprising a plurality of optical fibers (2a), the system (1) comprising: an optical power detector (6) comprising a light power monitor (61), a failure determination unit (62) and an alert signal generator (63), the light power monitor (61) measuring light intensity of an extracted portion of communication light transmitted through each optical fiber (2a) and calculating communication light intensity based on the measured light intensity, the failure determination unit (62) determining presence of failure in each optical fiber (2a) based on the measurement result of the light power monitor (61), and the alert signal generator (63) generating an alert signal when failure is determined to occur by the failure determination unit (62); an OTDR device (5) that injects optical pulses into the optical fiber (2a) to be measured and measures return light from the optical fiber (2a); and a monitoring device (8) comprising an OTDR controller (81) that causes the OTDR device (5) to measure return light from the optical fiber (2a) of the failure-occurring optical cable (2) when receiving an alert signal from the optical power detector (6).

[3] The optical cable monitoring system (1) defined by [2], wherein the monitoring device (8) comprises a fault location pinpointing unit (82) that pinpoints a fault location in a longitudinal direction of the optical cable (2) based on the measurement result of the OTDR controller (81).

[4] The optical cable monitoring system (1) defined by [3], wherein the monitoring device (8) comprises a map location pinpointing unit (83) that pinpoints a fault location on a map based on the fault location pinpointed by the fault location pinpointing unit (82).

[5] The optical cable monitoring system (1) defined by any one of [2] to [4], wherein the optical cable (2) comprises a monitoring optical fiber (2b) that is the optical fiber (2a) to be subjected to measurement by the OTDR device (5), and the OTDR controller (81), when received an alert signal from the optical power detector (6), causes the OTDR device (5) to measure return light from the monitoring optical fiber (2b) of the failure-occurring optical cable (2).

[6] The optical cable monitoring system (1) defined by [5], wherein the optical cable (2) comprises not less than three of the monitoring optical fibers (2b) that are arranged at distances in a circumferential direction of the optical cable (2).

[7] The optical cable monitoring system (1) defined by any one of [2] to [6], wherein the optical power detector (6) comprises a transmitter (64) that transmits data of communication light intensity of each optical fiber obtained by the light power monitor (61), and the monitoring device (8) comprises a failure's cause conjecturing unit (84) that conjectures a cause of failure based on the data of communication light intensity of each optical fiber (2a) received from the optical power detector (6).

[8] The optical cable monitoring system (1) described in any one of the [2] to [7], wherein the OTDR controller (81) performs regular inspection control under which the OTDR device (5) conducts measurement on all the optical cables (2) as monitoring subjects at every predetermined time interval.

[9] The optical cable monitoring system (1) defined by any one of [2] to [8], wherein the optical power detector (6) comprises a light leakage portion (65) that leaks a portion of communication light, and the light power monitor (61) comprises a light-receiving element (611) for receiving the leaking light leaking out at the light leakage portion (65), an amplifier circuit (612) for converting a current signal of the light-receiving element (611) into a voltage signal and also amplifying the signal, and a calculation unit (614) for calculating communication light intensity based on output voltage of the amplifier circuit (612).

[10] The optical cable monitoring system (1) defined by [9], wherein the optical power detector (6) comprises a temperature sensor (615) for detecting temperature inside the optical power detector (6), and the calculation unit (614) of the light power monitor (61) comprises a temperature correction section (614c) for correcting communication light intensity based on the temperature detected by the temperature sensor (615).

[11] The optical cable monitoring system (1) defined by [10], wherein the calculation unit (614) comprises a temperature correction map (614d) containing preset inclination correction factor k and bias correction factor b with respect to temperature, and the temperature correction section (614c) refers to the temperature correction map (614d) to obtain the inclination correction factor k and bias correction factor b corresponding to the temperature detected by the temperature sensor (615) and corrects communication light intensity using the formula L=Lm×k−b, where L is communication light intensity after correction and Lm is communication light intensity before correction.

[12] An optical cable monitoring system (1) for monitoring a health of optical cables (2) comprising a plurality of optical fibers (2a), the system (1) comprising: an optical power detector (6) comprising a light power monitor (61) and a transmitter (64), the light power monitor (61) measuring light intensity of an extracted portion of communication light transmitted through each optical fiber (2a) and obtaining communication light intensity based on the measured light intensity, and the transmitter (64) transmitting data of communication light intensity of each optical fiber (2a) obtained by the light power monitor (61); and a monitoring device (8) comprising an failure's cause conjecturing unit (84) that conjectures a cause of failure based on the data of communication light intensity of each optical fiber (2a) received from the optical power detector (6).

Although the embodiment of the invention has been described, the invention according to claims is not to be limited to the embodiment. Further, please note that all combinations of the features described in the embodiment are not necessary to solve the problem of the invention.

The invention can be appropriately modified and implemented without departing from the gist thereof.

The invention claimed is:

1. An optical cable monitoring system for monitoring a health of optical cables comprising a plurality of optical fibers, the system comprising:
an optical power detector comprising:
a light power monitor device measuring light intensity of an extracted portion of communication light transmitted through each optical fiber and obtaining communication light intensity based on the measured light intensity;
memory storing a program; and
a processor executing the program stored in the memory, the processor configured to determine presence of failure in each optical fiber based on the measurement result of the light power monitor device, and generate an alert signal when failure is determined to occur by the processor;
an OTDR (Optical Time-Domain Reflectometer) device that injects optical pulses into the optical fiber to be measured and measures return light from the optical fiber; and
a monitoring device comprising an OTDR controller that causes the OTDR device to measure return light from the optical fiber of the failure-occurring optical cable when receiving an alert signal from the optical power detector,
wherein the monitoring device comprises a second processor that is configured to pinpoint a fault location in a longitudinal direction of the optical cable based on the measurement result of the OTDR controller.

2. The optical cable monitoring system according to claim 1, wherein the monitoring device comprises the second processor that is configured to pinpoint a fault location on a map based on the fault location pinpointed by the second processor.

3. The optical cable monitoring system according to claim 1, wherein the optical cable comprises a monitoring optical fiber that is the optical fiber to be subjected to measurement by the OTDR device, and
wherein the OTDR controller, when received an alert signal from the optical power detector, causes the OTDR device to measure return light from the monitoring optical fiber of the failure-occurring optical cable.

4. The optical cable monitoring system according to claim 1, wherein the optical power detector comprises a transmitter that transmits data of communication light intensity of each optical fiber obtained by the light power monitor device, and
wherein the monitoring device comprises the second processor that is configured to conjecture a cause of failure based on the data of communication light intensity of each optical fiber received from the optical power detector.

5. An optical cable monitoring system for monitoring a health of optical cables comprising a plurality of optical fibers, the system comprising:
an optical power detector comprising:
a light power monitor device measuring light intensity of an extracted portion of communication light transmitted through each optical fiber and obtaining communication light intensity based on the measured light intensity;
memory storing a program; and
a processor executing the program stored in the memory, the processor configured to determine presence of failure in each optical fiber based on the measurement result of the light power monitor device, and generate an alert signal when failure is determined to occur by the processor;
an OTDR (Optical Time-Domain Reflectometer) device that injects optical pulses into the optical fiber to be measured and measures return light from the optical fiber; and
a monitoring device comprising an OTDR controller that causes the OTDR device to measure return light from the optical fiber of the failure-occurring optical cable when receiving an alert signal from the optical power detector, wherein the optical cable comprises a monitoring optical fiber that is the optical fiber to be subjected to measurement by the OTDR device, and wherein the OTDR controller, when received an alert signal from the optical power detector, causes the OTDR device to measure return light from the monitoring optical fiber of the failure-occurring optical cable.

6. The optical cable monitoring system according to claim 5, wherein the optical cable comprises not less than three of the monitoring optical fibers that are arranged at distances in a circumferential direction of the optical cable.

7. The optical cable monitoring system according to claim 5, wherein the optical power detector comprises a transmitter that transmits data of communication light intensity of each optical fiber obtained by the light power monitor device, and wherein the monitoring device comprises the second processor that is configured to conjecture a cause of failure based on the data of communication light intensity of each optical fiber received from the optical power detector.

8. An optical cable monitoring system for monitoring a health of optical cables comprising a plurality of optical fibers, the system comprising:

an optical power detector comprising:
a light power monitor device measuring light intensity of an extracted portion of communication light transmitted through each optical fiber and obtaining communication light intensity based on the measured light intensity;
memory storing a program; and
a processor executing the program stored in the memory, the processor configured to determine presence of failure in each optical fiber based on the measurement result of the light power monitor device, and generate an alert signal when failure is determined to occur by the processor;
an OTDR (Optical Time-Domain Reflectometer) device that injects optical pulses into the optical fiber to be measured and measures return light from the optical fiber; and
a monitoring device comprising an OTDR controller that causes the OTDR device to measure return light from the optical fiber of the failure-occurring optical cable when receiving an alert signal from the optical power detector,
wherein the optical power detector comprises a transmitter that transmits data of communication light intensity of each optical fiber obtained by the light power monitor device, and
wherein the monitoring device comprises the second processor that is configured to conjecture a cause of failure based on the data of communication light intensity of each optical fiber received from the optical power detector.

9. The optical cable monitoring system according to claim 8, wherein the optical cable comprises a monitoring optical fiber that is the optical fiber to be subjected to measurement by the OTDR device, and wherein the OTDR controller, when received an alert signal from the optical power detector, causes the OTDR device to measure return light from the monitoring optical fiber of the failure-occurring optical cable.

10. An optical cable monitoring system for monitoring a health of optical cables comprising a plurality of optical fibers, the system comprising:

an optical power detector comprising:
a light power monitor device measuring light intensity of an extracted portion of communication light transmitted through each optical fiber and obtaining communication light intensity based on the measured light intensity;
memory storing a program; and
a processor executing the program stored in the memory, the processor configured to determine presence of failure in each optical fiber based on the measurement result of the light power monitor device, and generate an alert signal when failure is determined to occur by the processor;
an OTDR (Optical Time-Domain Reflectometer) device that injects optical pulses into the optical fiber to be measured and measures return light from the optical fiber; and
a monitoring device comprising an OTDR controller that causes the OTDR device to measure return light from the optical fiber of the failure-occurring optical cable when receiving an alert signal from the optical power detector,
wherein the OTDR controller performs regular inspection control under which the OTDR device conducts measurement on all the optical cables as monitoring subjects at every predetermined time interval.

11. The optical cable monitoring system according to claim 10, wherein the optical cable comprises a monitoring optical fiber that is the optical fiber to be subjected to measurement by the OTDR device, and wherein the OTDR controller, when received an alert signal from the optical power detector, causes the OTDR device to measure return light from the monitoring optical fiber of the failure-occurring optical cable.

12. The optical cable monitoring system according to claim 10, wherein the optical power detector comprises a transmitter that transmits data of communication light intensity of each optical fiber obtained by the light power monitor device, and wherein the monitoring device comprises the second processor that is configured to conjecture a cause of failure based on the data of communication light intensity of each optical fiber received from the optical power detector.

13. An optical cable monitoring system for monitoring a health of optical cables comprising a plurality of optical fibers, the system comprising:

an optical power detector comprising:
a light power monitor device measuring light intensity of an extracted portion of communication light transmitted through each optical fiber and obtaining communication light intensity based on the measured light intensity;
memory storing a program; and
a processor executing the program stored in the memory, the processor configured to determine presence of failure in each optical fiber based on the measurement result of the light power monitor device, and generate an alert signal when failure is determined to occur by the processor;

an OTDR (Optical Time-Domain Reflectometer) device that injects optical pulses into the optical fiber to be measured and measures return light from the optical fiber; and a monitoring device comprising an OTDR controller that causes the OTDR device to measure return light from the optical fiber of the failure-occurring optical cable when receiving an alert signal from the optical power detector, wherein the optical power detector comprises a light leakage portion that leaks a portion of communication light, and wherein the light power monitor device comprises a light-receiving element for receiving the leaking light leaking out at the light leakage portion, an amplifier circuit for converting a current signal of the light-receiving element into a voltage signal and also amplifying the signal, and a calculation circuit for calculating communication light intensity based on output voltage of the amplifier circuit.

14. The optical cable monitoring system according to claim 13, wherein the optical power detector comprises a temperature sensor for detecting temperature inside the optical power detector, and wherein the calculation circuit of the light power monitor device comprises a temperature correction section for correcting communication light intensity based on the temperature detected by the temperature sensor.

15. The optical cable monitoring system according to claim 14, wherein the calculation circuit comprises a temperature correction map containing preset inclination correction factor k and bias correction factor b with respect to temperature, and wherein the temperature correction section refers to the temperature correction map to obtain the inclination correction factor k and bias correction factor b corresponding to the temperature detected by the temperature sensor and corrects communication light intensity by using the formula L=Lm×k−b, where L is communication light intensity after correction and Lm is communication light intensity before correction.

16. The optical cable monitoring system according to claim 13, wherein the optical cable comprises a monitoring optical fiber that is the optical fiber to be subjected to measurement by the OTDR device, and wherein the OTDR controller, when received an alert signal from the optical power detector, causes the OTDR device to measure return light from the monitoring optical fiber of the failure-occurring optical cable.

17. The optical cable monitoring system according to claim 13, wherein the optical power detector comprises a transmitter that transmits data of communication light intensity of each optical fiber obtained by the light power monitor device, and wherein the monitoring device comprises the second processor that is configured to conjecture a cause of failure based on the data of communication light intensity of each optical fiber received from the optical power detector.

* * * * *